United States Patent
Ide et al.

(10) Patent No.: US 11,253,845 B2
(45) Date of Patent: Feb. 22, 2022

(54) ACTIVATION OF INERT METAL COMPONENTS TO CATALYSTS

(71) Applicant: ExxonMobil Research and Engineering Company, Annandale, NJ (US)

(72) Inventors: Matthew S. Ide, Doylestown, PA (US); Anastasios I. Skoulidas, Pittstown, NJ (US); Joseph A. Camisa, Maywood, NJ (US); Jianxin J. Wu, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 778 days.

(21) Appl. No.: 15/977,040

(22) Filed: May 11, 2018

(65) Prior Publication Data

US 2018/0333704 A1 Nov. 22, 2018

Related U.S. Application Data (60) Provisional application No. 62/507,409, filed on May 17, 2017, provisional application No. 62/507,431, filed on May 17, 2017.

(51) Int. Cl.
| | |
|---|---|
| *B01J 23/889* | (2006.01) |
| *B01J 35/04* | (2006.01) |
| *B01J 37/12* | (2006.01) |
| *B01J 37/14* | (2006.01) |
| *B01J 37/16* | (2006.01) |
| *C01B 3/40* | (2006.01) |

(Continued)

(52) U.S. Cl.
CPC ....... *B01J 23/8898* (2013.01); *B01J 23/8885* (2013.01); *B01J 23/8892* (2013.01); *B01J 29/04* (2013.01); *B01J 35/04* (2013.01); *B01J 37/12* (2013.01); *B01J 37/14* (2013.01); *B01J 37/16* (2013.01); *B01J 37/18* (2013.01); *C01B 3/40* (2013.01); *C01B 2203/0233* (2013.01); *C01B 2203/0238* (2013.01); *C01B 2203/1058* (2013.01); *C01B 2203/1064* (2013.01); *C01B 2203/1088* (2013.01); *C01B 2203/1241* (2013.01)

(58) Field of Classification Search
CPC ...................................................... B01J 37/12
See application file for complete search history.

(56) References Cited

U.S. PATENT DOCUMENTS

| | | |
|---|---|---|
| 4,083,799 A | 4/1978 | Estes et al. |
| 6,166,283 A | 12/2000 | Bharadwaj et al. |

(Continued)

FOREIGN PATENT DOCUMENTS

AU  2013273714 A1  1/2014

OTHER PUBLICATIONS

The International Search Report and Written Opinion of PCT/US2018/032212 dated Aug. 8, 2018.

(Continued)

*Primary Examiner* — Peter F Godenschwager
(74) *Attorney, Agent, or Firm* — Liza Negron (57) ABSTRACT

Processes for transforming an inert metal component into an active metal catalyst are provided. Apparatus and methods using active metal catalyst prepared according the process described herein are also provided.

16 Claims, 2 Drawing Sheets

(51) Int. Cl.
*B01J 37/18* (2006.01)
*B01J 23/888* (2006.01)
*B01J 29/04* (2006.01)

(56) References Cited

U.S. PATENT DOCUMENTS

| | | | |
|---|---|---|---|
| 7,217,303 | B2 | 5/2007 | Hershkowitz et al. |
| 7,815,873 | B2 | 10/2010 | Sankaranarayanan et al. |
| 8,454,911 | B2 | 6/2013 | Hershkowitz et al. |
| 9,278,338 | B2 * | 3/2016 | Coupland .............. B01D 15/08 |
| 9,353,284 | B2 * | 5/2016 | Moussa ................ C09D 11/322 |
| 2006/0171880 | A1 | 8/2006 | Jung et al. |
| 2016/0136634 | A1 | 5/2016 | Coupland |
| 2016/0354756 | A1 | 12/2016 | Kamler |
| 2018/0200690 | A1 | 7/2018 | Faure et al. |
| 2018/0333703 | A1 | 11/2018 | Ide et al. |
| 2018/0333704 | A1 | 11/2018 | Ide et al. |
| 2019/0381491 | A1 | 12/2019 | Groeneveld et al. |

OTHER PUBLICATIONS

Avila et al., "Monolithic reactors for environmental applications: A review on preparation technologies", Chemical Engineering Journal 109 (2005) 11-36.

Choudhury et al., "Machinability of nickel-base super alloys: a general review", Journal of Materials Processing Technology 77 (1998) 278-284.

The International Search Report and Written Opinion of PCT/US2018/032207 dated Jan. 14, 2019.

\* cited by examiner

ACTIVATION OF INERT METAL COMPONENTS TO CATALYSTS

CROSS-REFERENCE TO RELATED APPLICATIONS

This application claims the benefit of U.S. Provisional Application No. 62/507,431, filed on May 17, 2017, the entire contents of which are incorporated herein by reference.

This application also claims the benefit of related U.S. Provisional Application No. 62/507,409, filed on May 17, 2017, the entire contents of which are incorporated herein by reference.

FIELD

The present application relates to activation of inert metal components to active catalysts and apparatuses and processes for using same.

BACKGROUND

Metal oxide and mixed metal oxide catalysts have vast application in industrial processes. A non-exhaustive list of industry applications include natural gas reforming, water gas shift, oxidative paraffin coupling, paraffin dehydrogenation to olefins, oxidative dehydrogenation of paraffins to olefins, methane/ethane dehydrogenation to aromatics, selective ammonia oxidation to nitrogen oxide, ammonia synthesis, hydrogen cyanide production, methanol oxidation to formaldehyde, catalytic combustion, solid oxide fuel cells, and combinations thereof.

Generally, supported metal catalysts are formed by affixing catalytic metal nanoparticles or microparticles onto a support material. Catalytic metals include transition metals, such as nickel, vanadium, palladium, platinum, gold, ruthenium, rhodium, iridium, copper, zinc, manganese, cobalt, iron, molybdenum, potassium, calcium, and magnesium. The support material is typically a solid with high surface area. Common support materials include various kinds of carbon, titania, zirconia, lanthanum oxide, iron oxide, chromium oxide, alumina, and silica. Two main methods are used to prepare supported catalysts. In the impregnation method, a suspension of the solid support is treated with a solution of a precatalyst, and the resulting material is then activated under conditions that will convert the precatalyst (often a metal salt) to a more active state, perhaps the metal itself, but can also include an oxide, sulfide, nitride, etc. In such cases, the catalyst support is usually in the form of pellets. Alternatively, supported catalysts can be prepared from homogeneous solution by co-precipitation. For example, an acidic solution of aluminum salts and precatalyst are treated with base to precipitate the mixed hydroxide, which is subsequently calcined.

Catalysts can be structured with number of different geometries including packed beds with catalytic beads or extrudates of various shapes and sizes or more structured forms including monoliths, hollow fibers, etc. Traditionally monolithic catalyst supports consist of many parallel channels separated by thin walls that are coated with a catalytic active substance. Current monoliths used for natural gas reforming are typically made of a ceramic, such as alumina, and are therefore catalytically inert.

Current processes for producing catalysts are inefficient because of the number of steps and multiple materials that are required. It would be valuable to create a metal catalyst particle, which does not require impregnation or washcoating. It would likewise be valuable if 3D printing techniques were used to form the catalysts to open up unique design geometries. For example, in the case of a monolithic structure, channels running through the monolith may be not only round, square, or hexagonal, but also in other shapes including but not limited to quadralobes or trilobes to maximize surface area and volumetric heat capacity. It may also be advantageous for the channels to have paths other than the straight through the monolith. Circuitous paths and chambers within the 3D printed monolith may also enhance the desired characteristics.

SUMMARY

Catalytic reactors, methods of preparing catalytic components, and methods of using said catalytic reactors are provided. In one aspect, a method of preparing a catalytic metal component is provided, comprising, constructing an inert metal component; wherein the inert metal component is constructed by additive manufacturing and exposing the inert metal component to a cyclic oxidative and reducing environment for a sufficient number of cycles to activate the inert metal component. The metal component may comprise a metal alloy such as a super alloy, e.g. Inconel 718. In certain embodiments the metal component comprises a Group 10 element such as nickel, platinum, or palladium. The inert metal component may have any number of geometries such as a monolith, sphere, bead, pellet, extrudate, trilobe, quadralobe, cube, ring, 1-hole, 2-hole, 3-hole, 4-hole, saddle, cross-web, or wire mesh.

In another aspect the oxidative environment comprises at least one of oxygen, carbon dioxide, carbon monoxide, water, combustion byproducts, peroxide, ozone, permanganate, organic acids, halides, or combinations thereof. In another aspect, the reducing environment comprises at least one of methane, ethane, propane, butane, higher C number paraffins, ethylene, propylene, butylene, higher C number olefins, acetylene, methylacetylene-propadiene (MAPD), hydrogen, carbon monoxide, hydrides, hydrogen sulfide, or combinations thereof. The number of cycles can vary to achieve activation, e.g. 5 to 300 cycles or 20 to 250 cycles.

In yet another aspect a reactor, comprising a catalytic metal component prepared according to the methods described above is provided. In a specific embodiment, the catalytic metal component has the geometry of a monolith; wherein the monolith comprises a plurality of cells with channels extending therefrom. The plurality of cells with channels can form squares, circles, ovals, hexagons, trilobes, quadrolobes, or a combination thereof. In additional aspects, the plurality of cells with channels comprises channels with non-linear pathways through the monolith. In yet another aspect, the monolith further comprises void spaces interrupting the channels forming chambers within the monolith.

A method of reforming a feed is also provided. The method comprising exposing a catalytic metal component prepared according to the methods described above to a reforming feed comprising hydrocarbons and steam, $CO_2$, or a combination thereof; and exposing the catalytic metal component to a combustion feed comprising $O_2$ or a combination of $O_2$ and $N_2$. In certain aspects, the reforming feed comprises methane and exposing the catalytic metal component to the reforming feed results in a conversion of methane into CO and $H_2$. In practice, conversion of greater than 70%, e.g. 80%, 85%, 90%, or even 95%, of methane is converted to CO and $H_2$.

DETAILED DESCRIPTION

Definitions

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the apparatuses and processes encompassed are not limited to the specific embodiments described below, but rather, include all alternatives, modifications, and equivalents falling within the true spirit and scope of the appended claims.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting

As used herein, the term "activate," "activates," "activating," refers to a transformation from a non-catalytic material to a catalytic material. A catalytic material is one that increases the rate of a chemical reaction. Metal catalysts, such as mixed metal oxide or precious metal oxide catalysts, can be used in a number of different chemistries. For example, such catalysts can be used in natural gas reforming, water gas shift, oxidative paraffin coupling, paraffin dehydrogenation to olefins, methane/ethane dehydrogenation to aromatics, ammonia oxidation to nitrogen oxide, ammonia synthesis, hydrogen cyanide production, methanol oxidation to formaldehyde, catalytic combustion, and fuel cells. Activation, as used herein, is evidenced in differently based on different chemistries, but in all cases, results in a substantial increase in reaction products when the reactants are reacted in the presence of an activated material, than when the reactants are reacted in the presence of a non-activated, but similarly structured material. Specifically, activation may be evidenced by an increase in reaction products of at least 300%, 400%, 500%, 600%, or even 1000% or 1500%. In reforming reactions, for example, activation may be indicated by a step-wise increase in hydrocarbon, such as methane, conversion to CO and $H_2$—e.g. from 0%-15% conversion to 60-90% conversion. A person of skill in the art should readily be able to discern when a non-catalytic material has become catalytic based on comparative data before and after activation as that process is described herein.

As used herein, the term "inert" refers to a material with low levels of chemical activity. In certain texts, the term "inert" refers to a material that is chemically inactive. For the avoidance of doubt, as used in this application, the term "inert" allows for some level of chemical activity at varying conditions, such as 0-20% conversion of reactants to products, e.g. 5-15% conversion.

Many of the examples provided herein will refer to natural gas reforming for syngas and hydrogen production. This is merely for illustrative purposes and it should be understood that the metal catalysts described herein can be used in any application in which metal catalysts would traditionally be used.

Hydrogen production is a valuable process in refining applications. Hydrogen is required for hydroprocessing applications, which generally refers to hydrotreating and hydrocracking. Hydrotreating depending on the type of application, is either to hydrogenate unsaturated bonds, reduce components to remove oxygen, or reduce inorganic components such as nitrogen or sulfur. This can be done either for reasons of desirable chemistry (e.g., the hydrogenation of benzene to produce cyclohexane for conversion to K-A oil), improving process performance (e.g., selective di-olefin hydrogenation forward of a selective butylenes to light olefins cracking process), or removing unwanted components (e.g., hydrodesulfurization or hydrodenitrogenation). Hydrocracking refers to an operation that takes a fraction of petroleum called gas oil which is heavy and "cracks" it into smaller molecules that are suitable for incorporation into other petroleum fractions such as gasoline, diesel, and jet fuels. Hydrogen is a key component of all hydroprocessing applications. Hydrogen also plays a key role in ammonia production.

Currently, most hydrogen produced in the United States is made by reforming hydrocarbons, mainly natural gas, via steam reforming. Other methods include partial oxidation (PDX), gasification, authothermal reforming (ATR), dry reforming and a combination of dry and steam reforming known as bi-reforming. Steam-methane reforming (SMR) is a process in which high temperature steam is used to produce hydrogen from a methane source in the presence of a catalyst. The reaction is as follows:

$$CH_4 + H_2O \rightarrow CO + 3H_2$$

Dry reforming is similar to SMR, but steam is replaced by carbon dioxide in the reforming reaction:

$$CH_4 + CO_2 = 2H_2 + 2CO$$

Steam reforming and dry reforming may also act in concert for a process known as bi-reforming. As shown hydrogen and carbon monoxide are produced as a result of these reforming reactions. This mixture can be referred to as synthesis gas or "syngas." Syngas generated with a $H_2/CO$ molar ratio between 1 and 3 is useful as a feed for the production of methanol, dimethyl ether, lube basestocks, and of course, hydrogen. The synthesis gas or "syngas" is a byproduct a variety of refinery processes. While most references herein are directed to the methane reforming reaction, it should be appreciated by persons of skill in the art that these reforming processes can apply to heavier petroleum fractions such as ethane, ethanol, propane, gasoline, or even whole crude.

It has been discovered that inert metal alloys can be transformed into active catalysts through an oxido-reductive promotion comprising subjecting the alloys to cyclic oxidizing and reducing environments. In oxidizing environments, the inert metal alloy tends to lose electrons to the surrounding environment. In reducing environments, the inert metal allow tends to gain electrons from the surrounding environment. Examples of oxidizing environments include oxygen, carbon dioxide, carbon monoxide, water, combustion byproducts, peroxide, ozone, permanganate, organic acids, halides, or combinations thereof. Examples of reducing environments include methane, ethane, propane, butane, higher C number paraffins, ethylene, propylene, butylene, higher C number olefins, acetylene, methylacetylene-propadiene (MAPD), hydrogen, carbon monoxide, hydrides, hydrogen sulfide, or combinations thereof. Carbon monoxide is listed as both an oxidizing agent and a reducing agent because it may potentially dissociate on the surface of the catalyst, thus forming elemental carbon and oxygen. The preceding lists are not exhaustive and a person of ordinary skill in the art would understand that the inert metal alloy starting material can be subjected to myriad oxidizing/reducing environment combinations. In the cases where the reducing environment includes carbon, then it would be understood by a person of skill in the art that the reducing environment is also a carburizing environment. The crux of the present disclosure is the cyclic nature of the exposure and the oxido-reductive promotion of the inert metal alloy to an active catalyst as a result.

The catalytic metals disclosed herein can be constructed using additive manufacturing. As used herein, additive manufacturing refers to any technology that builds 3D objects by adding layer-upon-layer of material, whether the material is plastic, metal, ceramic, etc. Additive manufacturing includes such technologies as 3D printing, direct metal laser sintering (DMLS), selective laser sintering (SLS), stereolithography, extrusion printing, etc. As used herein, the terms 3D printing and additive manufacturing are used interchangeably and do not necessarily refer to a specific unique process unless otherwise stated.

The types of metals and metal alloys that may be subjected to such oxido-reductive promotion include nickel, iron, or cobalt based metal alloys as catalyst supports. Referred to in the industry as "super alloys," said metals have excellent mechanical strength, the ability to withstand extremely high temperatures, good surface stability, and resistance to corrosion or oxidation. It is these same qualities that result in difficulties in machining these metals. See, e.g., *Machinability of nickel-base super alloys: a general review*, 77 J. OF MAT'L PROCESSING TECH. 278 (May 1, 1998). A non-exclusive list of super alloys embodied by the current disclosure include: Hastelloy (e.g. C-22, G-30, S, X), Inconel (e.g. 587, 597, 600, 601, 617, 625, 706, 718, X750), Waspaloy, Rene alloys, Haynes alloys, Incoloy (e.g. 800, 801, 802, 807, 825, 903, 907, 909), MP98T, TMS alloys, and CMSX single crystal alloys.

Inert metal alloy structures that can undergo oxido-reductive promotion include those structures normally associated with metal catalysts, such as monoliths (with channels that are circular, square, hexagonal, triangular, trilobes, quadrilobes, etc.), spheres, beads, pellets, extrudates, trilobes, quadralobes, cubes, rings, 1-hole, 2-hole, 3-hole, 4-hole, saddle, cross-web, and wire mess. In the case of a monolithic geometry, it may also be advantageous in some cases to have paths other than straight through the monolith. Circuitous paths and/or chambers within a 3D printed monolith may enhance desired characteristics. For example, a monolith could be 3D printed such that two alternating sets of channels were constructed perpendicular to one another. One of the channels could be used to do an exothermic/endothermic chemistry, while the other provides the heat/takes away the heat with steam or other medium. This would provide direct heat exchange within the monolith and eliminate heat transfer issues.

It has been discovered that exposing 3D printed metal or metal alloy structures to cyclic oxidative and reducing environments such as a reforming feed and subsequent combustion feed at high temperatures can result in activation of an otherwise non-catalytic structure. It is believed that any metal alloy with a minimum percentage of an active catalytic metal for the reaction of interest, such as nickel, platinum, palladium, rhodium, cobalt, silver, molybdenum, chromium, copper, and/or titanium can be transformed into a catalytic metal structure using the preparation methods described herein. In certain embodiments, without being bound by theory, it is believed that nanoparticles or microparticles within the metal alloy are activated and provide the catalytic properties for the metal structures described herein. It is important to note that none of the metal alloys described in the examples below would be considered catalytic to a person of skill in the art before being exposed to the methods of preparation described herein. A minimum percentage of a transition metal means at least 0.1% by mole, 1% by mole, or 10% by mole, such as 20-80%, such as 30-70%, such as 40-60%, such 45-55%.

As used herein, high temperatures include temperatures from 500-1600° C., for example 600-1300° C., for example 700-1200° C. In a preferred embodiment, the cyclic exposure to oxidative and reducing environments occurs between 800-1400° C.

In certain embodiments, a reforming feed and subsequent combustion feed can provide the cyclic oxidative and reducing environment required to activate the metal structures described herein. The reforming feed can include hydrocarbons plus steam, $CO_2$, or a combination of steam and $CO_2$. The combustion feed can include fuels plus air or a combination of $O_2$ and $N_2$. The process of cyclic exposure activates the 3D printed metal structure for other chemistries requiring a metal catalyst. Without being bound by theory, the cyclic exposure of the metal alloy may form catalytic nanoparticles or microparticles that are supported on an oxide layer on the surface of the metal component. Many combinations of metal oxide layer and catalytic nanoparticles or microparticles exist, but one example is for IN-718 alloy the nickel nanoparticles or microparticles can be supported on a primarily chromium oxide layer that also has titania, molybdenum, alumina, silica, etc.

The process of activating the metal structure can best be described with reference to the examples.

Example 1: Constructing the Metal Component (Monolith Geometry)

Figure 1:
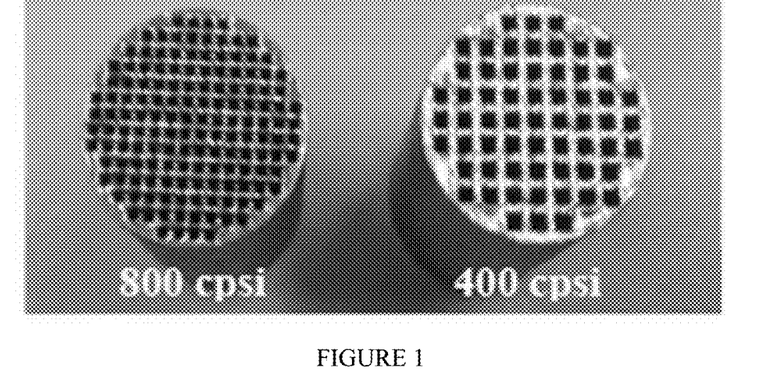
FIG. 1 is a photograph of two exemplary metal alloy monoliths manufactured according to the present disclosure.
Figure 2A:
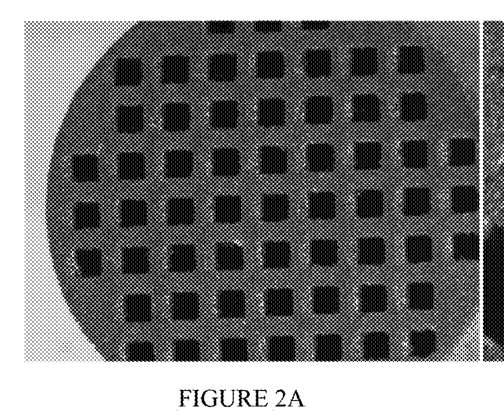
FIGS. 2A and 2B provide close up images of the metal allow monoliths depicted in FIG. 2.
Figure 2B:
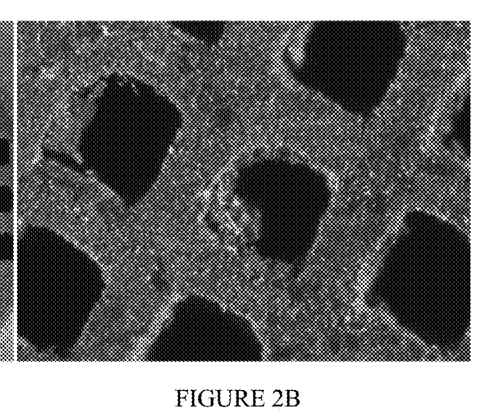
Figure 3:
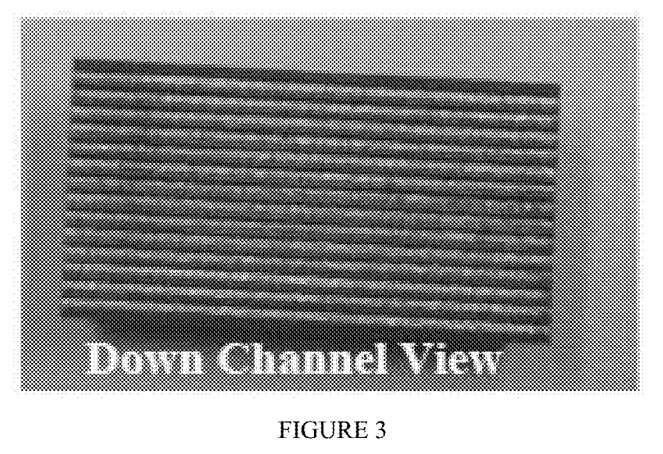
FIG. 3 is a cross-sectional view of the axial plane of a metal alloy monolith manufactured according to the present disclosure.

3D printed 1" long×0.5" diameter metal monoliths composed of Inconel 718 were constructed. Nominally, Inconel 718 alloy comprises nickel (50-55%), chromium (17-21%), tantalum (0.05% max), manganese (0.35% max), carbon (0.08% max), silicon (0.35% max), molybdenum (2.8-3.3%), niobium (4.75-5.5%), titanium (0.65-1.15%), cobalt (1% max), copper (0.3% max), phosphorus (0.015% max), sulfur (0.015% max), boron (0.006% max), and iron (balance). Both 400 cpsi and 800 cpsi (cells per square inch) were constructed via 3D printing as shown in FIG. 1. The 3D printing was completed by DMLS of Inconel 718 powder. FIGS. 2A and 2B show that due to the process of metal powder sintering a significant amount of surface area or roughness of the monolith walls is produced. The exterior roughness and increased surface area is likely beneficial to the catalytic activity of the 3D printed monolith as compared to a smoother-channeled monolith. Additionally, as seen particularly in FIG. 2B and FIG. 3, each channel is not identical as some variability is observed in the channel length as well as the sharpness of the corners for the square channels. Thus, the monolith does not have to be uniformly 3D printed to ensure that it will be catalytic, but a uniformly printed structure could exhibit the same or similar properties.

Examples 2-17: Laboratory Evaluation of 3D Printed Monoliths

The performance of the 3D printed metal monoliths constructed in Example 1 were evaluated for methane reforming (steam, dry, and bi-reforming) in a laboratory scale fixed bed, down-flow reactor. The 1"×0.5" monolith was wrapped in a high temperature alumina cloth to prevent bypassing and loaded into a quartz reactor with an inlet diameter of approximately 0.6". A thermocouple was located directly above the top of and directly below the bottom of the metal monolith. The methane and carbon dioxide conversion was determined by the disappearance of the reactant. The syngas ratio was calculated as the molar ratio of $H_2$ and CO in the products. All conversion for continuous flow experiments are reported after 1 hour of lineout. Lineout refers to the time on stream required to obtain a constant conversion of reactants to products. In the following experiments, lineout is where constant methane conversion is observed. All cycling conversions are reported after cycling to lineout at that temperature except where specifically noted in the table, i.e. Y-$5^{th}$ is after 5 consecutive cycles of oxidation and reforming, Y-$250^{th}$ is after 250 consecutive cycles of oxidation and reforming. The nitrogen included in each run is used as an internal standard for gas chromatograph analysis.

Example 2 shows initial experiments on Monolith A (800 cpsi and synthesized from Inconel 718 metal powder as described in Example 1). The reforming of methane with water (steam reforming) was performed on the monolith at a gas hourly space velocity (GHSV) of 10,000 $h^{-1}$ based on total monolith volume. The reforming feed had a gas composition of 20 vol % $CH_4$, 70 vol % $H_2O$, and 10 vol % $N_2$. At a temperature of 1000° C., the monolith exhibited minimal catalytic activity converting 15% of methane to products with a syngas ratio ($H_2$/CO) of approximately 3.51.

Some initial deactivation of the monolith was observed during the first 60 minutes of time on stream, but the conversion was constant at 15% for 180 minutes after the initial deactivation.

Examples 3-17 show the experiments on Monolith B (400 cpsi and synthesized from Inconel 718 metal powder as described in Example 1). Example 3 shows the simultaneous reforming of methane and carbon dioxide (bi-reforming) on Monolith B at a GHSV of 20,000 $h^{-1}$ based on total monolith volume and a gas composition of 42.9% $CH_4$, 31.4% $H_2O$, 15.7% $CO_2$, and 10% $N_2$. At a temperature of 800° C. and space velocity of 20,000 h−1, the monolith had no appreciable conversion after 60 min of TOS. While a small amount of hydrogen was observed at the start of reaction, there was no quantifiable production of CO. Any catalytic sites that were exposed at 800° C. to the bi-reforming feed likely coked immediately and became inactive for the methane reforming reaction.

Examples 4-15 show dry reforming (carbon dioxide) of methane with GHSVs of 10,000 $h^{-1}$ or 20,000 $h^{-1}$. Example 4 shows an experiment for cyclical dry reforming of methane with carbon dioxide a GHSV of 20,000 $h^{-1}$ and a gas composition of 43.1% $CH_4$, 46.9% $CO_2$, and 10% $N_2$. The cycling dry reforming experiments included an additional step wherein the reforming feed is introduced for 1 minute followed by a 7 second nitrogen purge and then a combustion feed of 5% $O_2$/$N_2$ feed is introduced for 1 minute followed by a 7 second nitrogen purge. This cycle was repeated for about 25 cycles to line out the conversion except when noted in Table 1 below.

Results for cycling dry reforming at 800, 900, and 1000° C. (oven set temperatures) are shown below in Table 1 and the conversion increases slightly with increasing temperature (Examples 4-6). At 1000° C. the GHSV was halved to 10,000 $h^{-1}$ and an approximate double in the methane conversion to 20% was achieved (Example 7). However, after 250 cycles (Example 8) at 1000° C. the methane conversion had increased to 88%. Thus, the catalytic monolith was activated by the cycling procedure to achieve a significantly higher conversion than before the activation procedure.

A temperature scan from 800 to 1100° C. was then undertaken with a maximum conversion of 94% being achieved at 950° C. (Examples 9-15). After the temperature scan, 1000 cycles of dry reforming were completed at 1000° C. and the methane conversion of 87% was nearly identical to the conversion after the $250^{th}$ cycle at 88%. Upon revisiting the bi-reforming non-cycling run condition (Example 16) at 800° C. and a space velocity of 20,000 $h^{-1}$, the methane conversion is now 78% compared to the prior methane conversion of 0% before cyclic activation. When temperature is increased to 1000° C. (Example 17), the methane conversion is increased to 98%.

TABLE 1

| Ex. | Mon. | Cycling | Reforming ($H_2O$ + $CO_2$:$CH_4$) | GHSV ($h^{-1}$ × $10^{-3}$) | Temperature (° C.) | CH4 Conv. (%) | $H_2$/CO |
|---|---|---|---|---|---|---|---|
| 2 | A | N | Steam (3.5:1) | 10 | 1000 | 15 | 3.51 |
| 3 | B | N | Bi (1.1:1) | 20 | 800 | 0 | — |
| 4 | B | Y | Dry (1.1:1) | 20 | 800 | 3 | 0.3 |
| 5 | B | Y | Dry (1.1:1) | 20 | 900 | 5 | 0.4 |
| 6 | B | Y | Dry (1.1:1) | 20 | 1000 | 9 | 0.5 |
| 7 | B | Y - $5^{th}$ | Dry (1.1:1) | 10 | 1000 | 20 | 0.5 |
| 8 | B | Y - $250^{th}$ | Dry (1.1:1) | 10 | 1000 | 88 | 0.9 |
| 9 | B | Y | Dry (1.1:1) | 10 | 800 | 77 | 0.9 |
| 10 | B | Y | Dry (1.1:1) | 10 | 850 | 87 | 0.9 |

TABLE 1-continued

| Ex. | Mon. | Cycling | Reforming ($H_2O + CO_2:CH_4$) | GHSV ($h^{-1} \times 10^{-3}$) | Temperature (°C.) | $CH_4$ Conv. (%) | $H_2/CO$ |
|---|---|---|---|---|---|---|---|
| 11 | B | Y | Dry (1.1:1) | 10 | 900 | 93 | 0.9 |
| 12 | B | Y | Dry (1.1:1) | 10 | 950 | 94 | 1.0 |
| 13 | B | Y | Dry (1.1:1) | 10 | 1050 | 68 | 0.8 |
| 14 | B | Y | Dry (1.1:1) | 10 | 1100 | 55 | 0.7 |
| 15 | B | Y - 1000th | Dry (1.1:1) | 10 | 1000 | 87 | 0.9 |
| 16 | B | N | Bi (1.1:1) | 20 | 800 | 78 | 2.1 |
| 17 | B | N | Bi (1.1:1) | 20 | 1000 | 98 | 2.0 |

Examples 18-27: Laboratory Evaluation of 3D Printed Monoliths with Oxidative Treatment The performance of a separate but equivalent 800 cpsi 3D printed metal monolith (Monolith C) was evaluated for methane reforming before and after being exposed to a 5% $O_2/N_2$ gas composition for 24 hours at 1000° C. The results are shown in Table 2 below. While the monolith had no activity (Example 18) before being exposed to the oxidative treatment, it did have some activity after the exposure and achieved a 27% methane conversion (Example 19). Upon cycling with dry reforming, the monolith achieved a 33% methane conversion after 5 cycles (Example 20) compared to the 20% conversion achieved over Monolith B (Example 7). It is believed this activity increase is accelerated by the oxidative treatment which tends to form a chromium oxide layer on the surface of the monolith.

A similar behavior was observed with Monolith C as with Monolith B while cycling with a conversion efficiency of 85% after 250 cycles (Example 21). Additionally, after cyclic activation of the catalyst, the bi-reforming methane conversion of Monolith C was 74% compared to the prior methane conversion of 27% after the oxidative treatment (Example 19).

TABLE 2

| Ex. | Mon. | Cycling | Reforming ($H_2O + CO_2:CH_4$) | GHSV ($h^{-1} \times 10^{-3}$) | Temperature (°C.) | $CH_4$ Conv. (%) | $H_2/CO$ |
|---|---|---|---|---|---|---|---|
| 18 | C | N | Bi (1.1:1) | 20 | 800 | 0 | — |
| | | | Exposed to 5% O2/N2 for 24 h at 1000° C. | | | | |
| 19 | C | N | Bi (1.1:1) | 20 | 800 | 27 | 2.4 |
| 20 | C | Y - 5th | Dry (1.1:1) | 10 | 1000 | 33 | 0.5 |
| 21 | C | Y - 250th | Dry (1.1:1) | 10 | 1000 | 85 | 0.9 |
| 22 | C | Y | Dry (1.1:1) | 10 | 800 | 68 | 0.9 |
| 23 | C | Y | Dry (1.1:1) | 10 | 850 | 82 | 0.9 |
| 24 | C | Y | Dry (1.1:1) | 10 | 900 | 90 | 0.9 |
| 25 | C | Y | Dry (1.1:1) | 10 | 950 | 88 | 1.0 |
| 26 | C | Y | Dry (1.1:1) | 10 | 1050 | 77 | 0.8 |
| 27 | C | Y | Dry (1.1:1) | 10 | 1100 | 68 | 0.7 |
| 28 | C | N | Bi (1.1:1) | 20 | 800 | 74 | 2.1 |

Examples 29-33: Laboratory Evaluation of Monel K 3D Printed Monoliths 3D printed 1" long×0.5" diameter metal monoliths composed of Monel K were constructed (Monolith D). Nominally, Monel K alloy comprises nickel (63-70%), aluminum (2.3-3.15%), manganese (1.5% max), carbon (0.25% max), titanium (0.35-0.85%), iron (2.0% max), and copper (balance). The 3D printing was completed by DMLS of Monel K powder.

Examples 29-33 show bi-reforming and dry reforming of methane with GHSVs of 10,000 $h^{-1}$ or 20,000 $h^{-1}$. Example 29 shows an experiment for cyclical bi-reforming of methane with carbon dioxide a GHSV of 20,000 $h^{-1}$ and a gas composition of 43.1% $CH_4$, 46.9% $CO_2$, and 10% $N_2$. As shown in Table 3 below the Monel K monolith exhibited no activity on the first cycle (Example 29). Results for cycling dry reforming at 1000° C. and GHSV of 10,000 $h^{-1}$ shows a substantial increase in activity, from 17% to 82%, between the first cycle (Example 30) and the 100th cycle (Example 31). The highest activity observed was 91% (Example 32) at 1500 cycles. Upon revisiting the bi-reforming non-cycling run condition (Example 33) at 1000° C. and a space velocity of 20,000 $h^{-1}$, the methane conversion is now 73% compared to the prior methane conversion of 0% before cyclic activation. The cycling dry reforming experiments included an additional step wherein the reforming feed is introduced for 1 minute followed by a 7 second nitrogen purge and then a combustion feed of 5% $O_2/N_2$ feed is introduced for 1 minute followed by a 7 second nitrogen purge. This cycle was repeated for about 25 cycles to line out the conversion except when noted in Table 3 below.

TABLE 3

| Ex. | Mon. | Cycling | Reforming ($H_2O + CO_2:CH_4$) | GHSV ($h^{-1} \times 10^{-3}$) | Temperature (° C.) | $CH_4$ Conv. (%) | $H_2/CO$ |
|---|---|---|---|---|---|---|---|
| 29 | D | N | Bi (1.1:1) | 20 | 800 | 0 | — |
| 30 | D | Y | Dry (1.1:1) | 10 | 1000 | 17 | |
| 31 | D | Y - $100^{th}$ | Dry (1.1:1) | 10 | 1000 | 82 | 0.9 |
| 32 | D | Y - $1500^{th}$ | Dry (1.1:1) | 10 | 1000 | 91 | 0.9 |
| 33 | D | N | Bi (1.1:1) | 20 | 1000 | 73 | 22 |

Examples 34-38: Laboratory Evaluation of Hastelloy X 3D Printed Monoliths 3D printed 1" long×0.5" diameter metal monoliths composed of Hastelloy X were constructed (Monolith E). Nominally, Hastelloy X alloy comprises nickel (balance), chromium (20.5-23%), tungsten (0.2-1% max), manganese (1% max), silicon (1% max), molybdenum (8-10%), cobalt (0.5-2.5%), and iron (17-20%). The 3D printing was completed by DMLS of Hastelloy X powder.

Examples 34-38 show dry reforming of methane with GHSVs of 10,000 $h^{-1}$. It must be appreciated at the outset that the beginning cycling data is missing due to a data recording malfunction. The data below, therefore, indicates activity of the Hastelloy X Monolith E after activation from cycling has already occurred. In other words, the examples below show the effect of temperature on conversion efficiency. Table 4 illustrates that increased temperature will increase activity of 3D printed components. Example 34 shows an experiment for cyclical dry-reforming of methane with carbon dioxide, a GHSV of 20,000 $h^{-1}$, and a gas composition of 43.1% $CH_4$, 46.9% $CO_2$, and 10% $N_2$. As shown in Table 4 below, Monolith E exhibited 53% conversion during the Example 34 cycle. As temperature is increased, so is the activity. The highest activity observed was 96% (Example 38). The cycling dry reforming experiments included an additional step wherein the reforming feed is introduced for 1 minute followed by a 7 second nitrogen purge and then a combustion feed of 5% $O_2/N_2$ feed is introduced for 1 minute followed by a 7 second nitrogen purge. This cycle was repeated for about 25 cycles to line out the conversion except when noted in Table 4 below.

TABLE 4

| Ex. | Mon. | Cycling | Reforming ($H_2O + CO_2:CH_4$) | GHSV ($h^{-1} \times 10^{-3}$) | Temp. (° C.) | $CH_4$ Conv. (%) | $H_2/CO$ |
|---|---|---|---|---|---|---|---|
| 34 | E | Y | Dry (1.1:1) | 10 | 800 | 53 | 0.7 |
| 35 | E | Y | Dry (1.1:1) | 10 | 850 | 64 | 0.8 |
| 36 | E | Y | Dry (1.1:1) | 10 | 900 | 73 | 0.9 |
| 37 | E | Y | Dry (1.1:1) | 10 | 950 | 80 | 0.9 |
| 38 | E | Y | Dry (1.1:1) | 10 | 1000 | 96 | 1.0 |

Examples 39-40: Laboratory Evaluation of Inconel 718 Powder

Inconel 718 powder from the same batch as the monolith constructed as described in Example 1 was set inside a packed bed and subjected to cyclic reducing and oxidative environments. The powder contained an equal amount of Inconel 718 on a per weight basis as the monolith constructed in FIG. 1. The powder exhibits characteristics that would be the same or similar as a spherical bead geometry.

Examples 39 and 40 show dry reforming of methane with GHSVs of 10,000 $h^{-1}$ and a gas composition of 43.1% $CH_4$, 46.9% $CO_2$, and 10% $N_2$. As shown in Table 5 below the Inconel 718 powder exhibited very little activity (10% conversion) through five cycles (Example 39). However, after the 250th cycle, the methane conversion increased to 84% conversion (Example 40). The cycling dry reforming experiments included an additional step wherein the reforming feed is introduced for 1 minute followed by a 7 second nitrogen purge and then a combustion feed of 5% $O_2/N_2$ feed is introduced for 1 minute followed by a 7 second nitrogen purge. This examples shows that different geometries of otherwise inert metals can be activated via oxido-reductive promotion.

TABLE 5

| Ex. | Mon. | Cycling | Reforming ($H_2O + CO_2$:$CH_4$) | GHSV ($h^{-1} \times 10^{-3}$) | Temp. (° C.) | $CH_4$ Conv. (%) | $H_2$/CO |
|---|---|---|---|---|---|---|---|
| 40 | Powder | Y ($5^{th}$) | Dry (1.1:1) | 10 | 1000 | 10 | 0.8 |
| 41 | Powder | Y ($250^{th}$) | Dry (1.1:1) | 10 | 1000 | 84 | 0.9 |

Figure 4:
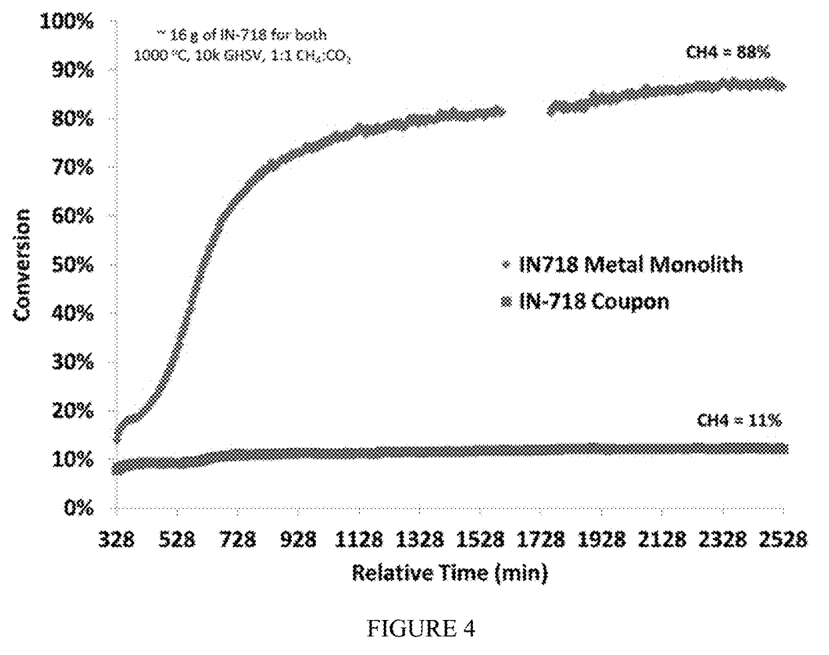
FIG. 4 is a graphical depiction comparing the catalytic activity between a 3D printed Inconel 718 metal monolith and an Inconel 718 metal coupon.

Example 42: Comparison of Activation of Inconel 718 3D Printed Monolith and Inconel 718 Metal Coupon An Inconel 718 monolith constructed as described in Example 1 and an Inconel 718 metal coupon were both subjected to cyclic reducing and oxidative environments. The monolith and the coupon contained an equal amount of Inconel 718 on a per weight basis. FIG. 4 shows graphically the activity increase in dry reforming (carbon dioxide) of methane with a GHSV of 10,000 $h^{-1}$ at 1000° C. and a feed gas composition of gas composition of 43.1% $CH_4$, 46.9% $CO_2$, and 10% $N_2$.

As shown, the 3D printed monolith is susceptible to activation by the methods described above, while the metal coupon is not.

ADDITIONAL EMBODIMENTS

Embodiment 1

A method of preparing a catalytic metal component, comprising; constructing an inert metal component; wherein the inert metal component is constructed by additive manufacturing; and exposing the inert metal component to a cyclic oxidative and reducing environment for a sufficient number of cycles to activate the inert metal component.

Embodiment 2

The method of embodiment 1, wherein the metal component comprises a metal alloy.

Embodiment 3

The method of embodiment 2, wherein the metal alloy comprises a Group 10 element.

Embodiment 4

The method of embodiment 3, wherein the Group 10 element comprises one of nickel, platinum, and palladium.

Embodiment 5

The method of any of embodiments 2-4, wherein the metal alloy is Inconel 718.

Embodiment 6

The method of any of the previous embodiments, wherein the inert metal component has the geometry of one of a monolith, sphere, bead, pellet, extrudate, trilobe, quadralobe, cube, ring, 1-hole, 2-hole, 3-hole, 4-hole, saddle, crossweb, and wire mess.

Embodiment 7

The method of any of the previous embodiments, wherein the inert metal component is a monolith.

Embodiment 8

The method of any of the previous embodiments, wherein the oxidative environment comprises at least one of oxygen, carbon dioxide, carbon monoxide, water, combustion byproducts, peroxide, ozone, permanganate, organic acids, halides, or combinations thereof.

Embodiment 9

The method of any of the previous embodiments, wherein the reducing environment comprises at least one of methane, ethane, propane, butane, higher C number paraffins, ethylene, propylene, butylene, higher C number olefins, acetylene, methylacetylene-propadiene (MAPD), hydrogen, carbon monoxide, hydrides, hydrogen sulfide, or combinations thereof.

Embodiment 10

The method of any of the previous embodiments, wherein the exposing the metal monolith to a cyclic oxidative and reducing environment includes 5 to 300 cycles.

Embodiment 11

The method of any of the previous embodiments, wherein the exposing the metal monolith to a cyclic oxidative and reducing environment includes 20 to 250 cycles.

Embodiment 12

The method of any of the previous embodiments, wherein the reducing environment comprises steam and hydrocarbons.

Embodiment 13

The method of any of the previous embodiments, wherein the reducing environment comprises $CO_2$ and hydrocarbons.

Embodiment 14

The method of any of the previous embodiments, wherein the oxidative environment comprises O2.

Embodiment 15

The method of any of the previous embodiments, wherein the oxidative environment comprises $O_2$ and $N_2$.

Embodiment 16

The method of embodiment 12, wherein the hydrocarbons comprise at least one of methane, ethane, propane, butane, gasoline, and whole crude.

Embodiment 17

A reactor, comprising a catalytic metal component prepared according to the method of any of the previous embodiments.

Embodiment 18

The reactor of embodiment 17, wherein the catalytic metal component has the geometry of one of a monolith, sphere, bead, pellet, extrudate, trilobe, quadralobe, cube, ring, 1-hole, 2-hole, 3-hole, 4-hole, saddle, cross-web, and wire mess.

Embodiment 19

The reactor of any of embodiments 17-18, wherein the metal component comprises a metal alloy.

Embodiment 20

The reactor of embodiment 19, wherein the metal alloy comprises a Group 10 element.

Embodiment 21

The reactor of embodiment 20, wherein the Group 10 element comprises one of nickel, platinum, and palladium.

Embodiment 22

The reactor of any of embodiments 19-21, wherein the metal alloy is one of an Inconel, Hastelloy, and Monel variant.

Embodiment 23

The reactor of any of embodiments 17-22, wherein the catalytic metal component has the geometry of a monolith; wherein the monolith comprises a plurality of cells with channels extending therefrom.

Embodiment 24

The reactor of embodiment 23, wherein the plurality of cells with channels form squares, circles, ovals, hexagons, trilobes, quadrolobes, or a combination thereof.

Embodiment 25

The reactor of embodiment 23 or 24, wherein the plurality of cells with channels comprises channels with non-linear pathways through the monolith.

Embodiment 26

The reactor of any of embodiments 23-25, wherein the monolith further comprises void spaces interrupting the channels forming chambers within the monolith.

Embodiment 27

A method of reforming a feed, comprising: exposing a catalytic metal component prepared according to the method of claim 1 to a reforming feed comprising hydrocarbons and steam, $CO_2$, or a combination thereof; and exposing the catalytic metal component to a combustion feed comprising $O_2$ or a combination of $O_2$ and $N_2$.

Embodiment 28

The method embodiment 27, wherein the reforming feed comprises methane; wherein exposing the catalytic metal component to the reforming feed results in a conversion of methane into CO and $H_2$.

Embodiment 29

The method of embodiment 27 or 28, wherein greater than 70% of the methane is converted to CO and $H_2$.

The invention claimed is:

1. A method of preparing a catalytic metal component, comprising;
   constructing an inert metal component; wherein the inert metal component is constructed by additive manufacturing; and
   exposing the inert metal component to a cyclic oxidative and reducing environment for a sufficient number of cycles to activate the inert metal component.

2. The method of claim 1, wherein the metal component comprises a metal alloy.

3. The method of claim 2, wherein the metal alloy comprises a Group 10 element.

4. The method of claim 3, wherein the Group 10 element comprises one of nickel, platinum, and palladium.

5. The method of claim 2, wherein the metal alloy is one of an Inconel, Hastelloy, and Monel variant.

6. The method of claim 1, wherein the inert metal component has the geometry of one of a monolith, sphere, bead, pellet, extrudate, trilobe, quadralobe, cube, ring, 1-hole, 2-hole, 3-hole, 4-hole, saddle, cross-web, and wire mesh.

7. The method of claim 6, wherein the inert metal component is a monolith.

8. The method of claim 1, wherein the oxidative environment comprises at least one of oxygen, carbon dioxide, carbon monoxide, water, combustion byproducts, peroxide, ozone, permanganate, organic acids, halides, or combinations thereof.

9. The method of claim 1, wherein the reducing environment comprises at least one of methane, ethane, propane, butane, ethylene, propylene, butylene, acetylene, methylacetylene-propadiene (MAPD), hydrogen, carbon monoxide, hydrides, hydrogen sulfide, or combinations thereof.

10. The method of claim 1, wherein the exposing the metal monolith to a cyclic oxidative and reducing environment includes 5 to 300 cycles.

11. The method of claim 10, wherein the exposing the metal monolith to a cyclic oxidative and reducing environment includes 20 to 250 cycles.

12. The method of claim 1, wherein the reducing environment comprises steam and hydrocarbons.

13. The method of claim 12, wherein the hydrocarbons comprise at least one of methane, ethane, propane, butane, gasoline, and whole crude.

14. The method of claim 1, wherein the reducing environment comprises $CO_2$ and hydrocarbons.

15. The method of claim 1, wherein the oxidative environment comprises $O_2$.

16. The method of claim 1, wherein the oxidative environment comprises $O_2$ and $N_2$.

\* \* \* \* \*